(12) United States Patent
Fujita

(10) Patent No.: US 10,118,641 B2
(45) Date of Patent: Nov. 6, 2018

(54) DRIVE ASSIST DEVICE

(71) Applicant: Nissan Motor Co., Ltd., Yokohama-shi, Kanagawa (JP)

(72) Inventor: Susumu Fujita, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/520,275

(22) PCT Filed: Oct. 22, 2014

(86) PCT No.: PCT/JP2014/078123
§ 371 (c)(1),
(2) Date: Apr. 19, 2017

(87) PCT Pub. No.: WO2016/063383
PCT Pub. Date: Apr. 28, 2016

(65) Prior Publication Data
US 2017/0320521 A1    Nov. 9, 2017

(51) Int. Cl.
*B62D 15/02*    (2006.01)
*B62D 6/00*    (2006.01)
(Continued)

(52) U.S. Cl.
CPC ... *B62D 15/0255* (2013.01); *B60W 30/18163* (2013.01); *B62D 6/00* (2013.01);
(Continued)

(58) Field of Classification Search
CPC ...... B62D 15/0255; B62D 6/00; G08G 1/167; G01C 21/34; B60W 30/18163
See application file for complete search history.

(56) References Cited

U.S. PATENT DOCUMENTS

| 9,775,004 B2 * | 9/2017 | Cawse ................ H04W 4/029 |
| 2005/0015203 A1 * | 1/2005 | Nishira ................ B60W 50/16 |
| | | 701/301 |

(Continued)

FOREIGN PATENT DOCUMENTS

| EP | 2453207 A2 | 5/2012 |
| JP | H09178505 A | 7/1997 |

(Continued)

*Primary Examiner* — Hussein Elchanti
(74) *Attorney, Agent, or Firm* — Young Basile Hanlon & MacFarlane, P.C.

(57) ABSTRACT

A drive assist device for assisting a drive when a subject vehicle changes lanes comprises a position measurement unit configured to measure a position of the subject vehicle; a detection unit provided at the subject vehicle and configured to detect a surrounding situation of the subject vehicle; a database configured to store map information; and a setting unit configured to set a lane change location and a reference point on a travel route of the subject vehicle on the basis of the position of the subject vehicle and the map information. The reference point is located ahead of the lane change location in a travel direction of the subject vehicle. The setting unit sets, on the basis of a detection range of the detection unit and a position of the reference point, a point at which the subject vehicle should complete changing lanes, as a lane change completion point.

13 Claims, 15 Drawing Sheets

(51) Int. Cl.
*G01C 21/34* (2006.01)
*G08G 1/16* (2006.01)
*B60W 30/18* (2012.01)
*G01C 21/36* (2006.01)
*G05D 1/02* (2006.01)

(52) U.S. Cl.
CPC ......... *G01C 21/34* (2013.01); *G01C 21/3602* (2013.01); *G01C 21/3658* (2013.01); *G05D 1/021* (2013.01); *G08G 1/167* (2013.01)

(56) References Cited

U.S. PATENT DOCUMENTS

| | | | |
|---|---|---|---|
| 2005/0256630 A1 | 11/2005 | Nishira et al. | |
| 2010/0063720 A1 | 3/2010 | Machino | |
| 2010/0161192 A1* | 6/2010 | Nara | B60W 10/06 701/70 |
| 2012/0123672 A1 | 5/2012 | Kojima et al. | |
| 2017/0018189 A1* | 1/2017 | Ishikawa | G05D 1/0214 |

FOREIGN PATENT DOCUMENTS

| | | |
|---|---|---|
| JP | 2002307976 A | 10/2002 |
| JP | 2004185504 A | 7/2004 |
| JP | 2005189009 A | 7/2005 |
| JP | 2007127416 A | 5/2007 |

* cited by examiner

DRIVE ASSIST DEVICE

TECHNICAL FIELD

The present invention relates to a drive assist device that assists a drive of a vehicle.

BACKGROUND

Route guidance systems are heretofore known which perform route guidance to allow movement between lanes. For example, JP2007-127416A discloses a route guidance system configured to retrieve a retrieval route, set a guidance point on the basis of the retrieval route, set a standard route guidance point for the guidance point, and determine whether a lane change prohibited zone is present on the retrieval route from an initial route guidance point based on the standard route guidance point to the guidance point. The lane change prohibited zone is a zone in which movement between lanes is prohibited. When the lane change prohibited zone is present, the route guidance point is set at the nearer side by a value to which the length of the lane change prohibited zone is added. When the vehicle arrives at the route guidance point, the route guidance system performs a voice outputting process to output route guidance in voices with regard to an intersection to be guided.

When the above technique of JP2007-127416A is applied to a vehicle and the vehicle changes lanes in accordance with the route guidance, an actual lane change may be performed in accordance with surrounding traffic situations and the like. According to the above technique of JP2007-127416A, however, the route guidance point is set only on the basis of the length of the lane change prohibited zone. When a lane change is performed in accordance with the route guidance of JP2007-127416A, therefore, it is difficult for a vehicle to detect environmental changes on the guided route and an appropriate lane change cannot be executed.

A problem to be solved by the present invention is to provide a drive assist device that can execute appropriate lane changes.

SUMMARY

The present invention solves the above problem as follows. A lane change location and a reference point are set on a travel route on the basis of the position of a subject vehicle and map information. The lane change location is a location at which the subject vehicle should change lanes. The reference point is located ahead of the lane change location in a travel direction of the subject vehicle. A point at which the subject vehicle should complete changing lanes is set as a lane change completion point, on the basis of a detection range of a detection unit and the position of the reference point.

According to the present invention, the point at which the lane change should be completed is set for the reference point on the basis of the detection range of the detection unit which detects surrounding situations of the subject vehicle. When the lane change is completed at that point, environmental changes on the travel route can readily be detected by the detection unit. Appropriate lane changes can therefore by executed.

DETAILED DESCRIPTION OF THE DRAWINGS

DETAILED DESCRIPTION OF THE EMBODIMENTS

Hereinafter, embodiments of the present invention will be described with reference to the drawings.

First Embodiment

Figure 1:
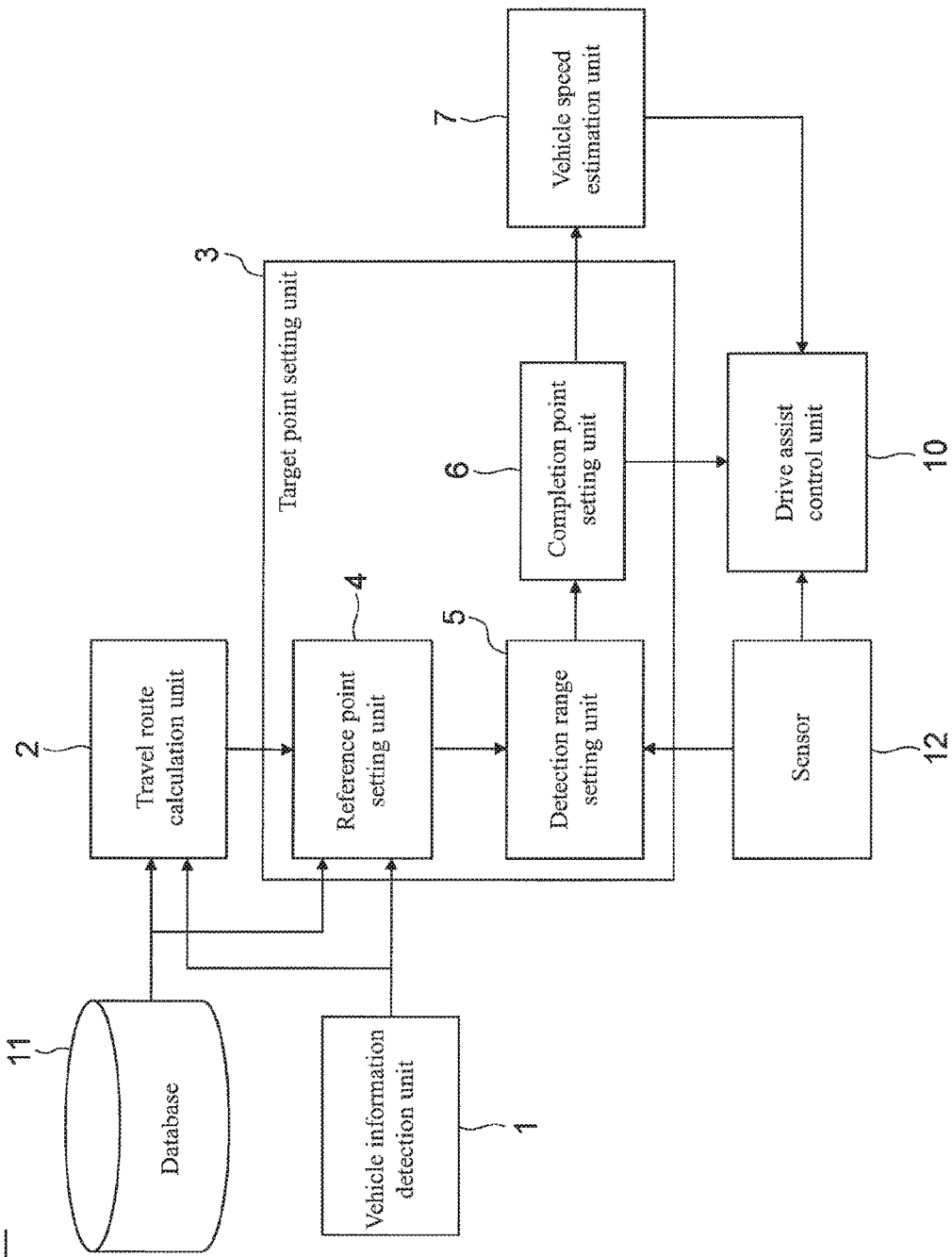
FIG. 1 is a block diagram of a travel assist device according to an embodiment of the present invention.

FIG. 1 is a block diagram of a drive assist device according to an embodiment of the present invention. The drive assist device according to the present embodiment is a device that is equipped in a vehicle to assist a drive when changing lanes.

The drive assist device comprises a read only memory (ROM) that stores various programs, a central processing unit (CPU) as an operation circuit that executes the programs stored in the ROM, and a random access memory (RAM) that functions as an accessible storage device.

The drive assist device comprises a drive assist control unit 10, a database 11, and a sensor 12. The database 11 stores map data. The map data is map information such as link data and node data. The map data includes information on travel lanes and information that restricts travel of a vehicle. The information on travel lanes may be, for example, information on a lane, such as a right-turn lane, straight-through lane and left-turn lane, among a plurality of lanes of a road that is connected to an intersection. In addition or alternatively, the information on travel lanes may be, for example, information on a main road and a merging lane that merges into the main road. In addition or alternatively, the information on travel lanes may be, for example, information on a main road and a branching lane that branches from the main road. The map database also stores information on zones in which lane changes are prohibited and information on lines that indicate prohibition of lane changes, as information for restricting lane changes when traveling on above lanes.

The sensor 12 is a sensor for detecting surrounding situations of a subject vehicle. Examples of the sensor 12 include cameras, millimeter-wave devices, and radars. The sensor 12 is provided at the subject vehicle.

The drive assist control unit 10 controls a drive of the subject vehicle on the basis of a detection value of the sensor 12. The drive assist control unit 10 recognizes the situations ahead of the subject vehicle, for example, using the sensor 12 and controls the subject vehicle to decelerate when the distance between the subject vehicle and a vehicle ahead of the subject vehicle is shorter than a predetermined distance. The drive assist control unit 10 also controls the subject vehicle to stop short of the vehicle located ahead in order to avoid collision with it. The drive assist control unit 10 may not only perform control for deceleration but also autonomously control a drive, such as a lane change and right or left turn.

The drive assist device has a vehicle information detection unit 1, a travel route calculation unit 2, a target point setting unit 3, and a vehicle speed estimation unit 7 as functional blocks for setting a lane change pattern suitable for the above-described drive assist. The target point setting unit 3 has a reference point setting unit 4, a detection range setting unit 5, and a completion point setting unit 6.

The vehicle information detection unit 1 detects vehicle information of the subject vehicle. The vehicle information includes positional information of the subject vehicle and other items. The vehicle information detection unit 1 has a function to be used with the GPS or the like and measures the current position of the vehicle.

The travel route calculation unit 2 acquires the vehicle information from the vehicle information detection unit 1 and calculates a travel route from the current position of the vehicle to a destination while referring to the map data.

The target point setting unit 3 sets a location, at which the subject vehicle changes lanes, on the travel route. The target point setting unit 3 also sets a target point for a lane change when the subject vehicle changes lanes so that the subject vehicle can detect the surrounding environment using the sensor 12 after the lane change.

After acquiring the travel route from the travel route calculation unit 2, the reference point setting unit 4 refers to the map data stored in the database 11 to set a location at which the subject vehicle should change lanes (referred also to as a "lane change location," hereinafter) on the travel route from the current position of the subject vehicle to the destination. For example, the lane change location is set, such as when traveling on a road of two lanes and turning right at an intersection located ahead or when entering the main road at a merging point of a highway. In addition or alternatively, the lane change location may be a location at which the travel of the subject vehicle is restricted due to the shape of the road when the subject vehicle travels on the travel route. The reference point setting unit 4 sets the lane change location with reference to road information included in the map data.

The reference point setting unit 4 sets, on the travel route, a reference point that is to be a reference when setting a lane change completion point which will be described later. The reference point is located ahead of the lane change location in the travel direction of the subject vehicle. Details of the reference point will be described later. The reference point setting unit 4 sets the lane change location and the reference point on the travel route on the basis of the position of the subject vehicle and the map information.

The detection range setting unit 5 sets a detection range of the sensor 12.

The completion point setting unit 6 sets a point at which the subject vehicle should complete changing lanes (referred also to as a "lane change completion point," hereinafter) on the basis of the detection range of the sensor 12 and the reference point which is set by the reference point setting unit 4.

The target point setting unit 3 outputs the lane change location, reference point and lane change completion point to the vehicle speed estimation unit 7 and the drive assist control unit 10, as various target points.

The vehicle speed estimation unit 7 estimates a vehicle speed at which the subject vehicle should travel at the lane change completion point, on the basis of the distance from the lane change completion point to the reference point and a deceleration from the lane change completion point to the reference point.

Figure 2:
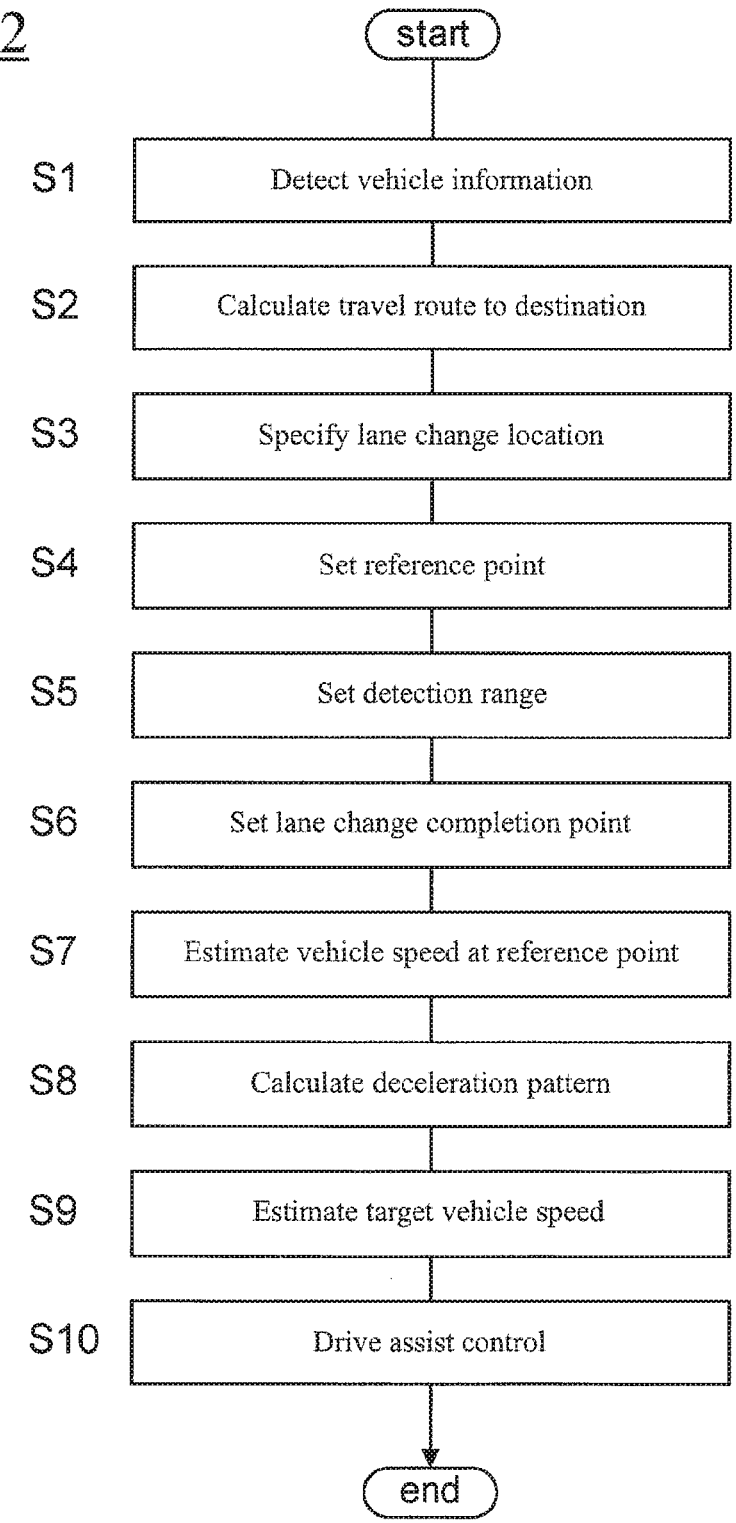
FIG. 2 is a flowchart illustrating a control flow of a drive assist device.
Figure 3:
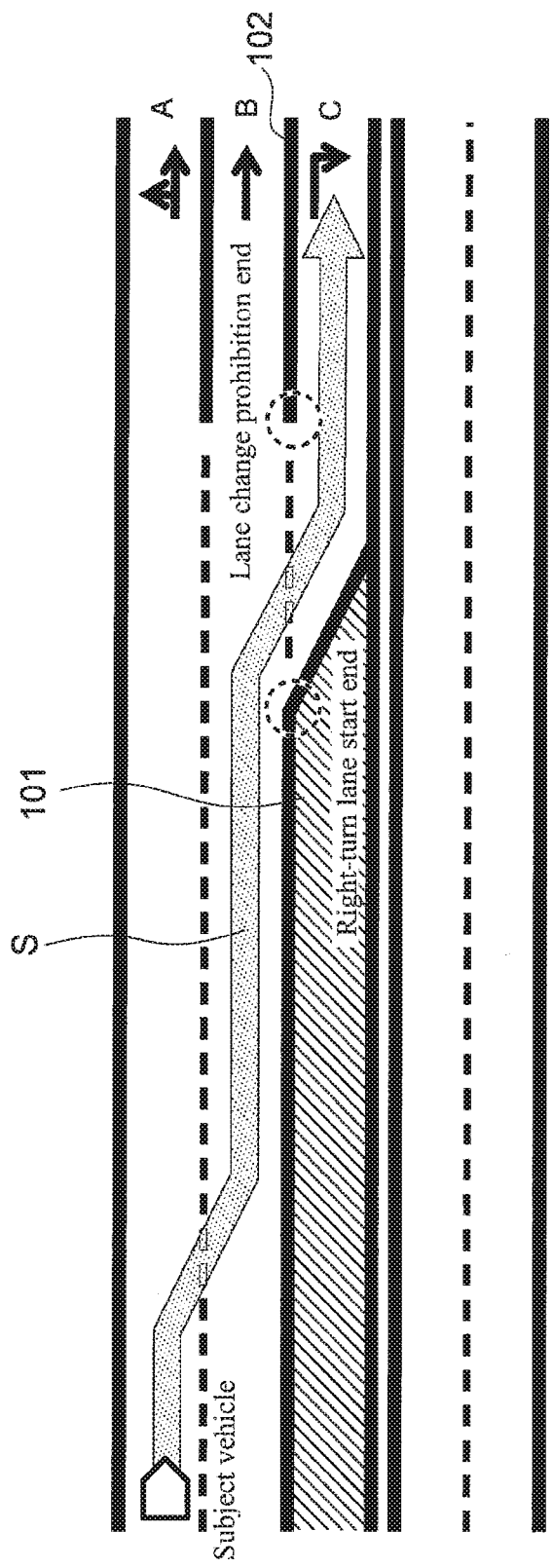
FIG. 3 is a view illustrating an example of the layout of a road.

Control by the drive assist device will then be described while referring to a specific example. FIG. 2 is a flowchart illustrating a control flow of the drive assist device. A specific example is illustrated in which the subject vehicle is traveling on a three-lane road and turns right at an intersection located ahead. FIG. 3 is a view illustrating a layout of the road as a specific example. As illustrated in FIG. 3, the subject vehicle is traveling in a lane A at the moment and should change lanes from the lane A to a lane (passing lane) B and further from the lane B to a lane C for turning right at the intersection located ahead. A part of the lane C is a zone in which lane changes are prohibited.

First, in step S1, the vehicle information detection unit 1 detects a position of the subject vehicle as the current vehicle information of the subject vehicle. The position of a vehicle is detected by a combination of the global positioning system (GPS), gyro-sensor, vehicle speed sensor, and the like. The position of a vehicle is not limited to a current position of the vehicle stopping and may also be a current position of the vehicle traveling.

In step S2, the travel route calculation unit 2 calculates a travel route to a destination on the basis of the current position of the vehicle. The travel route is a route on which the subject vehicle is to travel from there. The travel route may be calculated by using a car navigation system. Calculation of the travel route may not necessarily obtain a lane in which the vehicle should travel, and suffices to determine whether the vehicle should go straight ahead on the route or go straight through, turn right or turn left at an intersection.

In step S3, the reference point setting unit 4 specifies an intersection on the travel route on the basis of the current position of the vehicle and the map information. The reference point setting unit 4 then sets a lane change location on the basis of the specified intersection and the travel route. In the example of FIG. 3, the reference point setting unit 4 refers to the map information to specify that the road connecting to the intersection has three lanes, and can specify that the subject vehicle turns right from the travel route at the intersection. Accordingly, the reference point setting unit 4 can specify that the subject vehicle needs to change lanes before the intersection in order to travel through the intersection. The reference point setting unit 4 can also specify a location at which lane change is necessary, from the layout of the road connecting to the intersection. Thus, the reference point setting unit 4 specifies a location at which lane change is necessary, on the basis of a road structure represented by the map information, and the reference point setting unit 4 sets the location as a lane change location.

When the travel route includes a plurality of intersections, the reference point setting unit 4 specifies each intersection and specifies a lane change location on the basis of the road information of a road connecting to the intersection and the travel route. This allows the reference point setting unit 4 to specify all of the intersections on the travel route and lane change locations.

In step S4, the reference point setting unit 4 sets a reference point on the basis of the map data. The reference point represents the position of a feature that affects a travel of the subject vehicle when assisting the travel of the subject vehicle. In the example of FIG. 3, the travel of the subject vehicle is restricted by a lane change prohibited zone 101 and a line 102 that indicates prohibition of lane changes, in the travel route (represented by arrow S of FIG. 3) of the subject vehicle.

The lane change prohibited zone 101 is painted as a plurality of oblique lines. The right-turn lane is a short-distance lane before the intersection and located at the right side with respect to the passing lane. When entering the right-turn lane, the vehicle should change lanes from the passing lane to the right-turn lane. To restrict this lane change, the lane change prohibited zone 101 is painted.

The line 102 is painted as a solid orange line. Lane changes are prohibited in a range of 30 meters before the intersection and the line 102 represents the prohibition of lane changes.

The reference point setting unit 4 specifies the end of the lane change prohibited zone 101 as a reference point in the travel direction of the subject vehicle. This reference point represents a start end part at which the right-turn lane starts when the subject vehicle travels on the travel route (this reference point will also be referred to as a "right-turn lane start end," hereinafter). In addition or alternatively, the reference point setting unit 4 sets a start end of the line 102 as a reference point in the travel direction of the subject vehicle. This reference point represents the start end part of a zone in which lane changes are prohibited when the subject vehicle travels on the right-turn lane (this reference point will also be referred to as a "lane change prohibition end," hereinafter).

When there is a plurality of specified reference points, the reference point setting unit 4 sets a reference point located nearest to the subject vehicle as a reference point of a control object.

When assisting the drive on the travel route, the drive assist control unit 10 detects the lane change prohibited zone 101 using the sensor 12 after changing lanes from the travel lane to the passing lane. Then, the drive assist control unit 10 detects the line 102 using the sensor 12 after changing lanes from the passing lane to the right-turn lane. That is, the reference point set by the reference point setting unit 4 corresponds to a position that should be detected by the sensor 12 for the travel after changing lanes. In FIG. 3, the detection range of the sensor 12 (e.g. wide angle of a camera) is set such that the sensor 12 can detect the reference point (right-turn lane start end).

In step S5, the detection range setting unit 5 sets the detection range of the sensor 12. For example, the sensor 12 is assumed to be a plurality of sensors, including not only a camera but also any of a millimeter-wave device, radar and laser, which are provided at the subject vehicle to complement each detection range of the sensors. Here, the detection range (detection distance) of a sensor as the typical value (nominal value) of the sensor performance may be 200 meters in the case of a millimeter-wave device, hundreds of meters in the case of radar, 100 meters in the case of laser, and tens of meters in the case of a camera.

The detection range of a sensor may be defined not only by a distance but by an angle. The detection range of a millimeter-wave device is relatively narrow angle, but the detection range of a camera can be selected to be narrow or wide because of a wide angle of lenses.

When a plurality of sensors is arranged such that they cover the same range to avoid erroneous recognition, the maximum detection range by the sensors may be used as the detection range of the sensors or the minimum detection range may be used as the detection range of the sensors.

The description below will be made on the assumption that the imaging range of a camera is the detection range (e.g. 50 meters), for descriptive purposes.

In step S6, the completion point setting unit 6 sets a lane change completion point at a position separate from the reference point (right-turn lane start end) by a length of the detection range in the direction opposite to the travel direction of the subject vehicle. The length of the detection range is the length of a line of the detection range along the travel direction of the vehicle.

Figure 4:
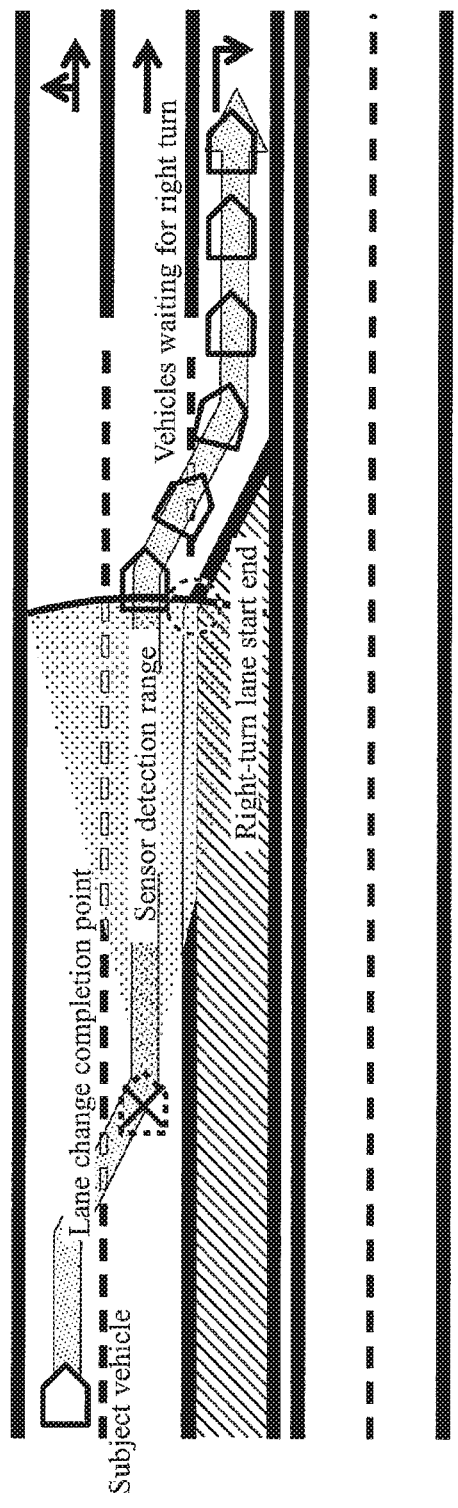
FIG. 4 is a view illustrating an example of the layout of a road.
Figure 5:
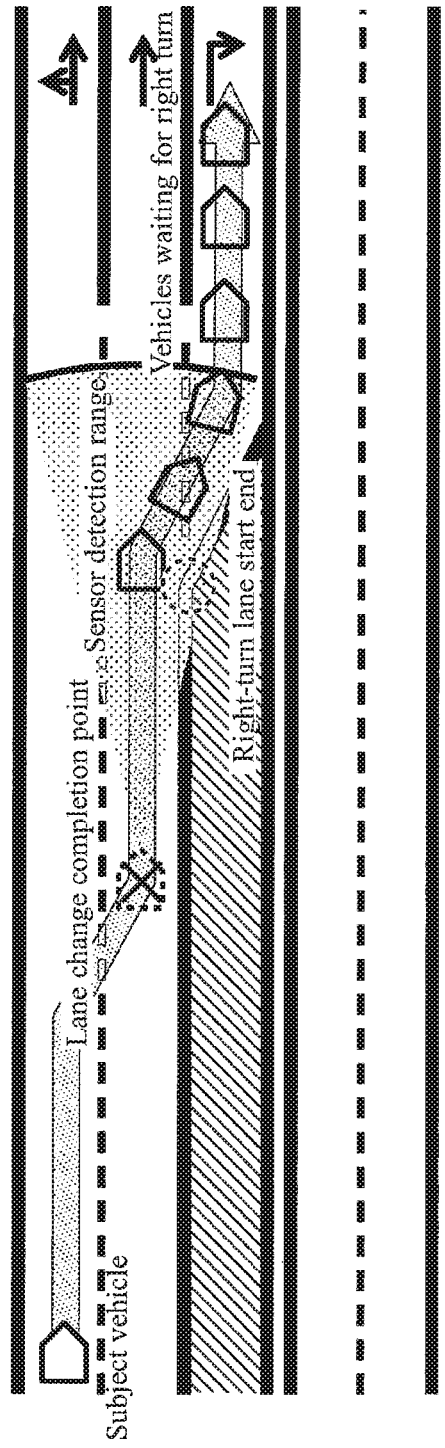
FIG. 5 is a view illustrating an example of the layout of a road.

With reference to FIG. 4 and FIG. 5, the positional relationship among the reference point (right-turn lane start end), detection range and lane change completion point will be described. FIG. 4 and FIG. 5 are views each illustrating the layout of a road and this layout is the same as that of FIG. 3.

As illustrated in FIG. 4, the lane change completion point is set at a position that approaches the subject vehicle from the reference point (right-turn lane start end) by the length of the detection range. When the subject vehicle travels along the travel route from the road before the intersection toward the intersection, the lane change completion point is set at a position at which, after the subject vehicle changes lanes from the travel lane to the passing lane, the drive assist control unit 10 can detect the reference point (right-turn lane start end) using the sensor 12.

If the lane change completion point is set at a position nearer to the subject vehicle than the position illustrated in FIG. 4, the reference point (right-turn lane start end) will not be included in the detection range immediately after the subject vehicle changes lanes from the travel lane to the passing lane. Assuming that a point at which a vehicle traveling in the passing lane starts to detect the reference point (right-turn lane start end) is a detection start point, if the distance between the lane change completion point and the detection start point is long, the subject vehicle will travel in the passing lane for a long time after the lane change. Such a travel may not be preferred.

On the other hand, if hypothetically, the lane change completion point is set at a position farther from the subject vehicle than the position illustrated in FIG. 4, the timing of detecting the reference point (right-turn lane start end) by the sensor 12 will delay after the subject vehicle changes lanes from the travel lane to the passing lane. For example, when, as illustrated in FIG. 5, vehicles waiting right turn at the intersection run off the right-turn lane, the drive assist is not executed until the subject vehicle reaches the lane change completion point. Then, if the subject vehicle completes changing lanes at the lane change point in accordance with the drive assist, the subject vehicle will require rapid deceleration because the inter-vehicle distance from the subject vehicle to the vehicle located ahead is short.

In the present embodiment, the position of the lane change completion point is set so as to coincide with the timing of detecting the reference point (right-turn lane start end) by the sensor 12 after the subject vehicle changes lanes from the travel lane to the passing lane. Thus, after the completion of lane change, the road environment around the reference point (right-turn lane start end) can be perceived by taking full advantage of the detection range of the sensor. Moreover, the situation of the right-turn lane (e.g. situation as illustrated in FIG. 5 in which vehicles waiting for right turn run off the right-turn lane) can be instantaneously confirmed and the subject vehicle can flexibly respond to such vehicles located ahead.

In step S7, the vehicle speed estimation unit 7 estimates the vehicle speed at the reference point (right-turn lane start end) on the basis of the map information. In the example of FIG. 4, the subject vehicle enters the right-turn lane from the reference point (right-turn lane start end) and therefore the vehicle speed at the reference point (right-turn lane start end) will be a lower speed than the legal speed because of the road structure in the vicinity of the reference point (right-turn lane start end). In addition, after entering the right-turn lane from the reference point (right-turn lane start end), the subject vehicle will decelerate in preparation for right turn at the intersection.

Since there may be cases where the traffic signal at the intersection has turned red and where other vehicles queue in preparation for right turn at the intersection, the vehicle speed at the reference point (right-turn lane start end) will be further reduced. For example, assuming that other vehicles fill the right-turn lane and the subject vehicle is forced to stop before entering the right-turn lane, the vehicle speed estimation unit 7 estimates the vehicle speed at the reference point (right-turn lane start end) to be zero [km/h]. On the other hand, assuming that other vehicles do not fill the right-turn lane and the subject vehicle can smoothly enter the right-turn lane, the vehicle speed estimation unit 7 estimates the vehicle speed to be 20 to 30 [km/h] for a road of a legal speed of 60 [km/h]. Thus, the vehicle speed estimation unit 7 estimates the vehicle speed while taking into account the traffic environment around the reference point (right-turn lane start end). The description below will be made on the assumption that the vehicle speed at the reference point (right-turn lane start end) is estimated to be zero [km/h].

In step S8, the vehicle speed estimation unit 7 calculates a deceleration pattern from the lane change completion point to the reference point (right-turn lane start end) on the basis of the estimated vehicle speed. The deceleration pattern is represented by a deceleration of the vehicle speed. For example, when the deceleration is sufficiently moderate, the deceleration may be 0.15 G. The deceleration pattern may be a pattern of an approximately fixed deceleration, or the deceleration may also be varied in accordance with the speed.

In step S9, the vehicle speed estimation unit 7 estimates a vehicle speed at which the subject vehicle should travel at the lane change completion point (referred also to as a "target vehicle speed," hereinafter) on the basis of the vehicle speed at the reference point (right-turn lane start end) and the deceleration pattern. The target vehicle speed is a target value of the subject vehicle's speed which should be reached when the lane change is completed.

In the example of FIG. 4, assume that v [km/h] represents the target vehicle speed and t represents a time required for the subject vehicle to decelerate using a fixed deceleration (0.15 G) from the lane change completion point to the reference point (right-turn lane start end).

A length (d [m]) of the detection range of the sensor 12 is represented by Equation (1).

[Expression 1]

$$d = \frac{v}{3.6} \times t - \frac{1}{2} \times (0.15 \times 9.8) \times t^2 \qquad (1)$$

In addition, the relationship between the speed (v) and time (t) at the lane change completion point is represented by Equation (2).

[Expression 2]

$$\frac{v}{3.6} = (0.15 \times 9.8) \times t \qquad (2)$$

The speed (v) is therefore represented by Equation (3) from Equations (1) and (2).

[Expression 3]

$$v = \sqrt{2 \times 3.6^2 \times (0.15 \times 9.8) \times d} \qquad (3)$$

When a camera is used as the sensor 12, the detection range may be tens of meters. As one example, the target vehicle speed is v=43.65 [km/h] when d=50 [m] from Equation (3).

That is, when the subject vehicle decelerates to a target vehicle speed of 43.65 [km/h] at the lane change completion point (position before the right-turn lane start end by 50 meters), the subject vehicle can stop at the reference point (right-turn lane start end) while decelerating at 0.15 G. When the vehicle speed calculated using the above equations is higher than the legal speed, the vehicle speed estimation unit 7 may calculate the legal speed as the target vehicle speed.

In step S10, the drive assist control unit 10 performs the drive assist control so that the subject vehicle complete changing lanes at the lane change completion point and the vehicle speed when the lane change is completed comes to the target vehicle speed. In the case of autonomous drive, for example, the drive assist control at the time of lane change performs acceleration, steering, braking and other necessary operations for the subject vehicle so that the vehicle speed at the lane change completion point comes to the target vehicle speed and the subject vehicle completes changing lanes at the lane change completion point.

Thus, in the present embodiment, when a location at which a lane change should be performed is set on the travel route to a destination, the lane change completion point is set on the basis of the detection range of the sensor. When the drive assist is performed so as to complete changing lanes at the lane change completion point, therefore, the sensor 12 can readily detect an environmental change around the reference point in the lane changed. Consequently, appropriate lane changes can be realized while preventing rapid lane changes or rapid deceleration after completion of the lane change.

As the above, in the present embodiment, the lane change location and the reference point are set on the travel route on the basis of the position of the subject vehicle and the map information and the lane change completion point is set on the basis of the detection range of the sensor 12 and the position of the reference point. Through this operation, when the lane change is performed at the lane change completion point, the sensor 12 can readily detect the environmental change on the travel route to the reference point. The lane change can therefore be performed at an appropriate location.

In the present embodiment, the position to be detected by the sensor 12 is set as the reference point for the travel after changing lanes at the lane change completion point. Through this operation, when the lane change is performed at the lane change completion point, the sensor 12 can readily detect the environmental change around the reference point. The lane change can therefore be performed at an appropriate location.

In the present embodiment, the lane change completion point is set at a position separate from the reference point by a length of the detection range in the direction opposite to the travel direction of the subject vehicle. Through this setting, when the lane change is completed at the lane change completion point, at least a distance corresponding to the detection range of the sensor 12 can be ensured between the subject vehicle and the reference point. The road environment around the reference point can therefore be perceived by taking full advantage of the detection range of the sensor.

In the present embodiment, the vehicle speed at which the subject vehicle should travel at the lane change completion point is estimated on the basis of the distance from the lane change completion point to the reference point and the deceleration from the lane change completion point to the reference point. Through this estimation, the drive assist can be controlled using the estimated vehicle speed which is set as a target vehicle speed thereby to prevent rapid deceleration after changing lanes.

In the present embodiment, the location of a lane change required for a travel through an intersection is set as the lane change location. This allows the drive assist to execute an appropriate lane change when the lane change is necessary for the travel through the intersection.

In the present embodiment, the reference point is set on the basis of the structure of a road represented by the map information. This allows the reference point to be set on the basis of universal features of the road structure, such as lane and road shapes. Typical lane changes can therefore be executed on the route on which a lane change is planned.

In the present embodiment, the reference point may be a start end (corresponding to the right-turn lane start end) when changing lanes after completion of the lane change at the lane change completion point. In this case, lane changes can be realized so as to allow smooth travel while observing the traffic rules.

In the present embodiment, the detection range of the sensor 12 is set in accordance with the typical value of the sensor 12. This allows execution of appropriate lane changes while perceiving the error of the sensor 12 and the tendency of the detection range of the sensor 12.

Figure 6:
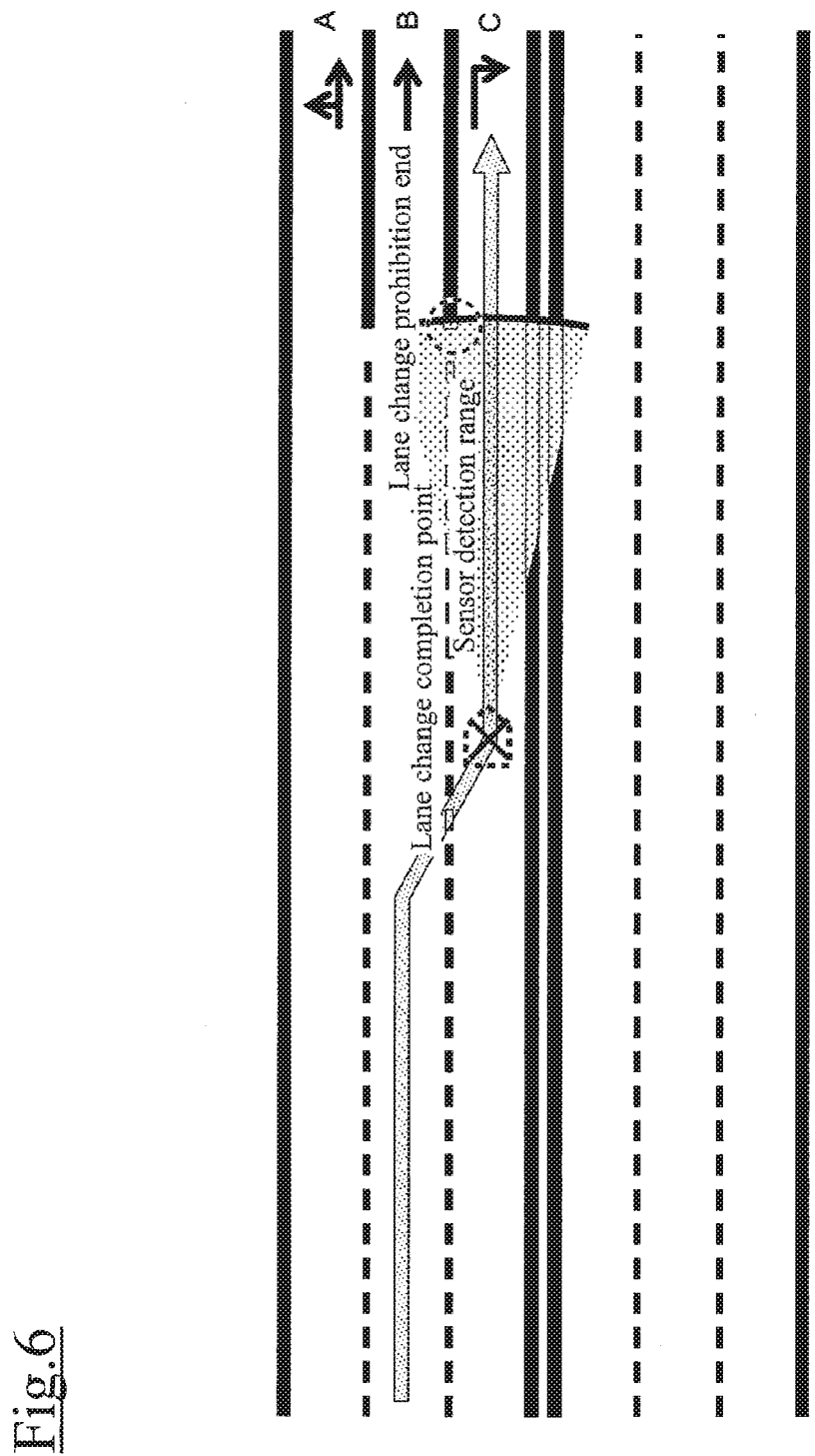
FIG. 6 is a view illustrating an example of the layout of a road.

In the present embodiment, the reference point is the right-turn lane start end, but the reference point may be the lane change prohibition end. FIG. 6, which illustrates the layout of a road, is a view for describing the control when the lane change prohibition end is the reference point. The lane change prohibited zone 101 does not exist in the layout of FIG. 6, as compared with the layout of FIG. 4. Others are the same as those in the layout of FIG. 4. In the layout of FIG. 6, the same control as the above is executed while the lane change prohibition end is set as the reference point, when changing lanes from the lane B to the lane C.

The present embodiment is described with reference to an example of traveling through an intersection after the lane change, but the intersection may be substituted, for example, by a merging point or a branching point.

The drive assist device may calculate the travel route not only when the vehicle is traveling but also when the vehicle is stopping.

The present embodiment is described with reference to an exemplary case of the three-lane road comprising the travel lane, passing lane and exclusive right-turn lane, but the present embodiment is not limited to this and may also be applied to a two-lane road comprising a traveling lane and a passing lane. For example, in a scene in which the subject vehicle is traveling in the travel lane and should change lanes to the passing lane before reaching an intersection (such as when the subject vehicle should turn right immediately after passing through an intersection), a stop line of the intersection is set as the reference point, and the lane change completion point from the travel lane to the passing lane is set. The lane change completion point is set to a point separate from the stop line by a length of the detection range of the sensor 12 in the direction opposite to the travel direction of the subject vehicle. In such an example, when another vehicle waiting for the traffic signal exists in the passing lane, the waiting vehicle can be instantaneously confirmed and the same effects as the above can thus be obtained.

The above vehicle information detection unit 1 corresponds to the "position measurement unit" of the present invention, the sensor 12 corresponds to the "detection unit" of the present invention, the target point setting unit 3 corresponds to the "setting unit" of the present invention, and the vehicle speed estimation unit 7 corresponds to the "vehicle speed estimation unit" of the present invention.

Second Embodiment

Figure 7:
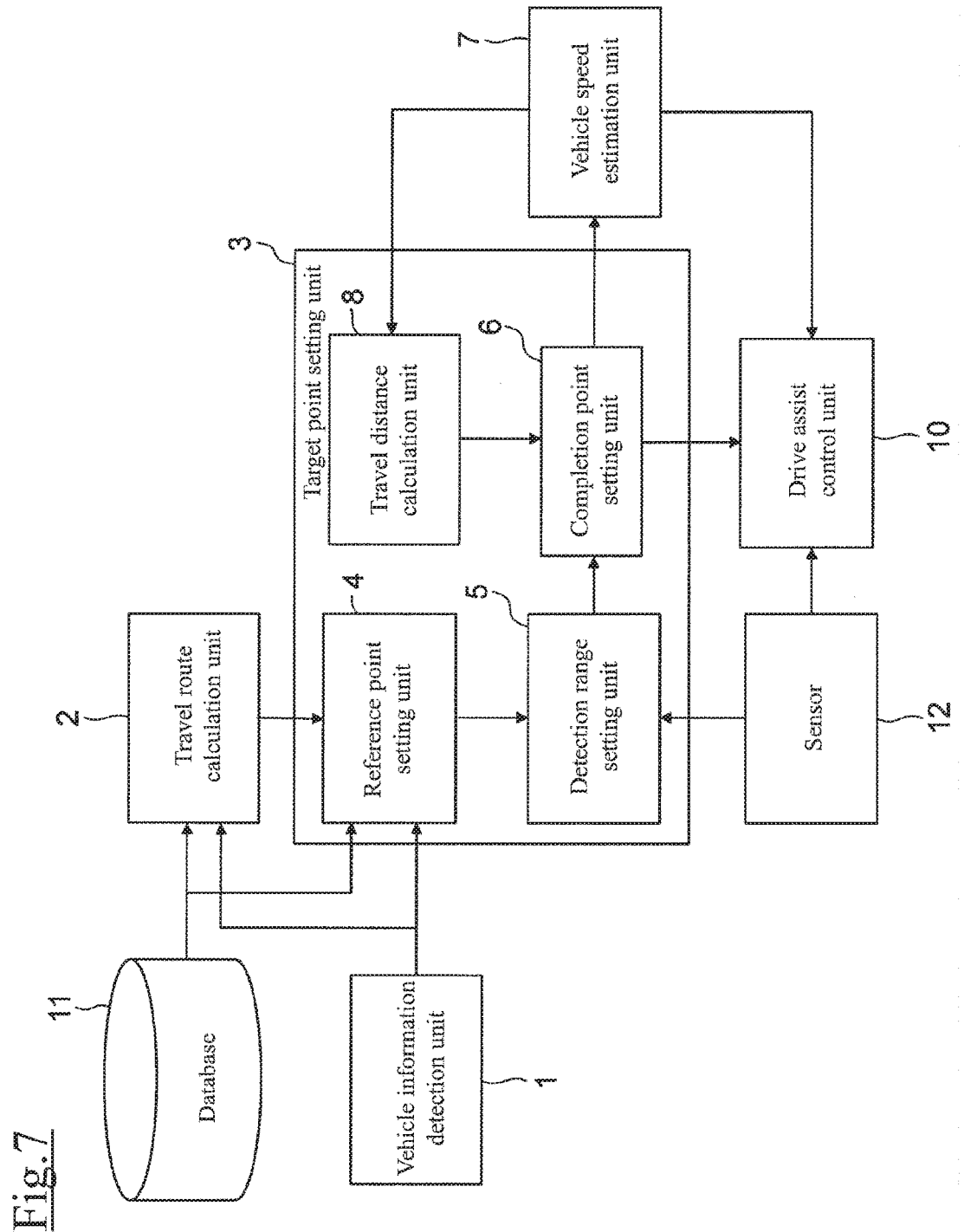
FIG. 7 is a block diagram of a travel assist device according to another embodiment of the present invention.

FIG. 7 is a block diagram of a drive assist device according to another embodiment of the present invention. As compared with the above-described first embodiment, this embodiment is different in that the drive assist device comprises a travel distance calculation unit 8. Other features are the same as those in the above-described first embodiment and the description is borrowed herein.

The target point setting unit 3 has a travel distance calculation unit 8 in addition to the reference point setting unit 4 and the like. The travel distance calculation unit 8 calculates a travel distance of the subject vehicle, which moves to the reference point after changing lanes, on the basis of the vehicle speed of the subject vehicle after changing lanes and the deceleration from the point of lane change to the reference point. The travel distance calculation unit 8 outputs the calculation result to the completion point setting unit 6.

Figure 8:
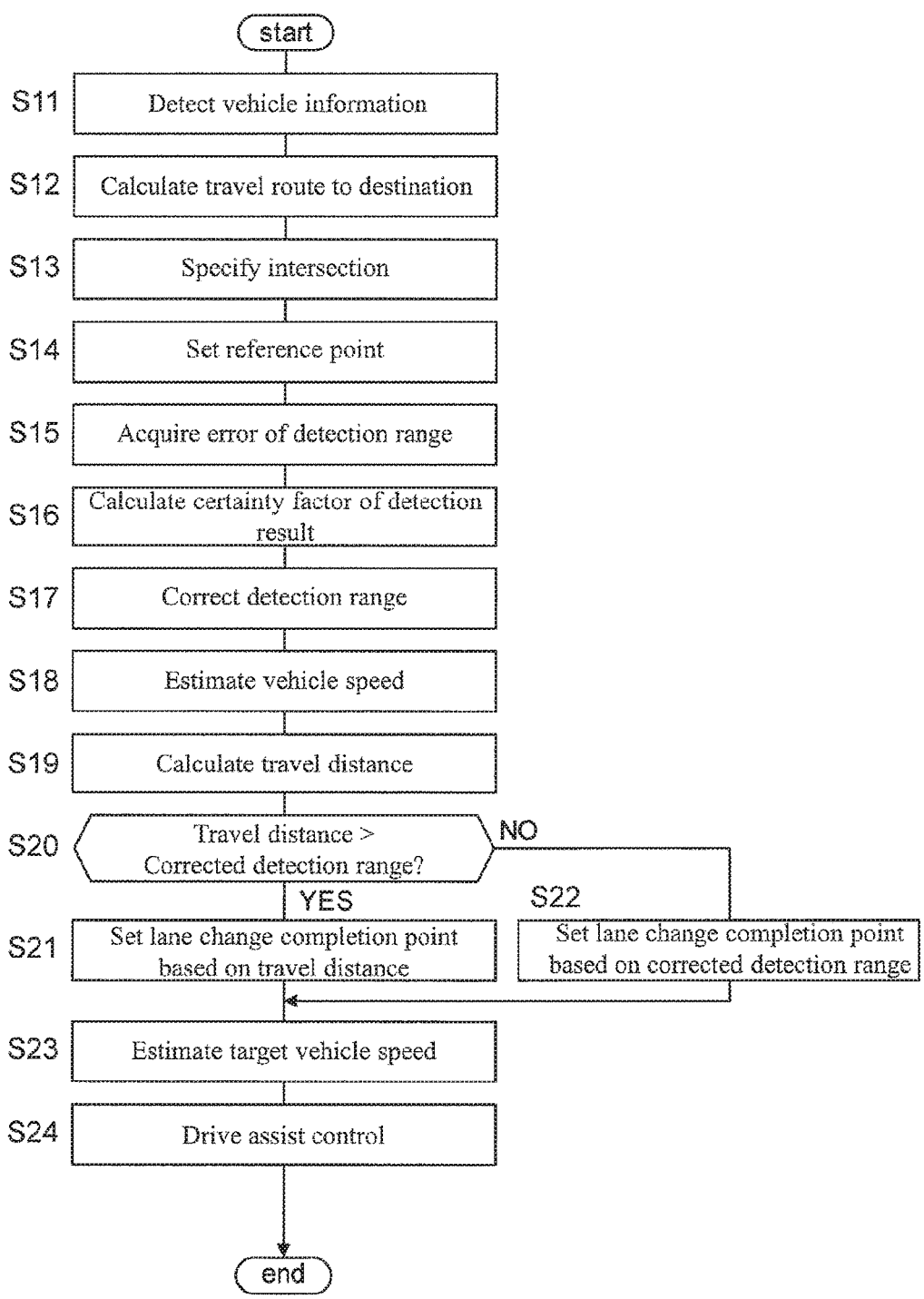
FIG. 8 is a flowchart illustrating a control flow of a drive assist device.

Control of the drive assist device will then be described. FIG. 8 is a flowchart illustrating a control flow of the drive assist device.

The control flow of steps S11 to S14 is the same as the control flow of steps S1 to S4 of the first embodiment.

In step S15, the detection range setting unit 5 acquires an error of the detection range of the sensor 12. The sensor 12 includes a plurality of sensors, such as a millimeter-wave device, radar, laser and camera, which have different characteristics. Laser can realize very high accuracy in distance measurement and detection (e.g. an error of 1% in the distance) due to the signal used and the measurement method. On the other hand, cameras do not have distance measurement and detection performance in themselves and therefore are allowed to measure a distance by means of motion stereo, for example, using time-series recognition results of one camera. However, the detection performance and distance measurement performance of cameras are low as compared with laser. In other words, the error included in the detection result of the sensor 12 can be defined by unique values of sensor devices and recognition methods with the sensor. Thus, the performance is different in accordance with various sensors that constitute the sensor 12. The detection range setting unit 5 perceives the detection error of the sensor 12 based on the performance and the like of each sensor.

In step S16, the detection range setting unit 5 calculates a certainty factor of the detection range of the sensor 12. Not only the error but also the certainty factor is different in various sensors, such as a camera and radar, which constitute the sensor 12. The certainty factor is an index that represents whether or not the detection result can be assured as a correct result. The certainty factor included in the detection result of a sensor takes a value that varies depending on the situation. For example, the detection range setting unit 5 can calculate the certainty factor on the basis of a movement process of a target object to be detected because such a movement process of a target object can be perceived by analyzing the time-series data during the travel. In addition, the detection range setting unit 5 perceives the surrounding situations around the vehicle which is currently traveling, using the sensor 12. The surrounding situations detected by the sensor 12 do not change in a while. For example, when the previous detection result of the sensor 12 indicates that another vehicle is traveling side by side with the subject vehicle, the current detection result of the sensor 12 will also indicate that the presence of the other vehicle is detected even with a different relative position of the other vehicle. When the current detection result does not indicate the presence of the other vehicle, the certainty factor of the sensor 12 may be low. The detection range setting unit 5 compares the previous detection result with the current detection result to determine the continuity of the surrounding situations and can thereby calculate the certainty factor.

Figure 9:
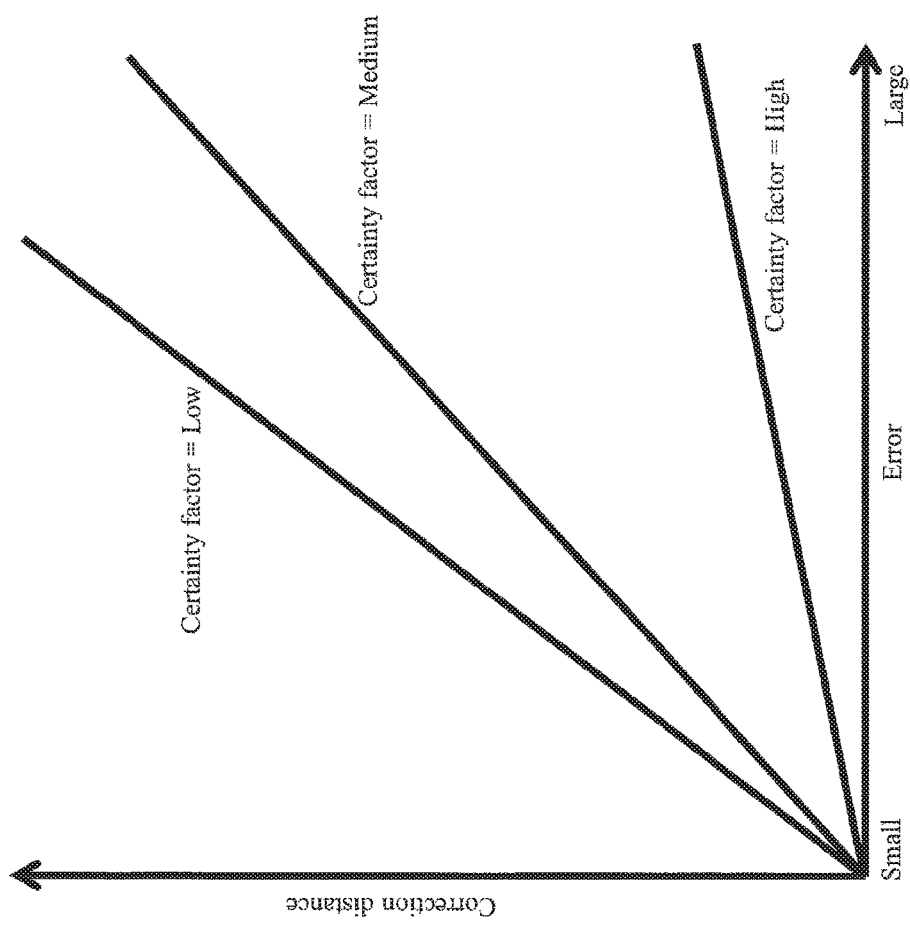
FIG. 9 is a graph illustrating the relationship among an error, a certainty factor and a correction distance.

In step S17, the detection range setting unit 5 corrects the detection range of the sensor 12 on the basis of the error and the certainty factor. The detection range setting unit 5 stores a map that represents a correspondence relationship among the error, the certainty factor and a correction distance. FIG. 9 is a graph illustrating the relationship represented by the map. The map exhibits characteristics in which, as the error increases, the correction distance increases and, as the certainty factor decreases, the correction distance increases. The correction distance is a correction value that is added to the length of the detection range to correct the detection range.

When the error is very small and the certainty factor is very high, the detection range of the sensor does not have to be corrected. When the certainty factor is high and the error is large, the detection can be performed, but the detected value includes a large amount of error. When the error is small and the certainty factor is low, the error is small, but the detection cannot be performed. Thus, the detection range is corrected with consideration for a low certainty factor and a large error such that the detection range is widened.

The detection range setting unit 5 calculates a correction distance that corresponds to the error and certainty factor of the sensor 12, while referring to the map. The detection range setting unit 5 adds the correction distance to the detection range for correcting the detection range. Hereinafter, the detection range after the correction will also be referred to as a "corrected detection range."

In step S18, the vehicle speed estimation unit 7 estimates the vehicle speed at the reference point and the vehicle speed of the subject vehicle when changing lanes. The vehicle speed at the reference point is estimated in the same manner as in the estimation method of step S7 according to the first embodiment. In step S18, the lane change completion point is not fixed and the target vehicle speed is not estimated. The vehicle speed estimation unit 7 therefore calculates the legal speed as the vehicle speed when changing lanes. If the vehicle speed when changing lanes can be expected to be lower than the legal speed, such as due to the road structure at the lane change location, for example, the vehicle speed estimation unit 7 may calculate a lower vehicle speed than the legal speed as the vehicle speed when changing lanes.

In step S19, the travel distance calculation unit 8 calculates a travel distance for the subject vehicle to move to the reference point after changing lanes. The travel distance is a travel distance of the subject vehicle that is required for the vehicle speed when changing lanes to come to the vehicle speed at the reference point under a fixed deceleration. The vehicle speed when changing lanes is a vehicle speed (e.g. legal speed) that is estimated by the vehicle speed estimation unit 7. The fixed deceleration is preliminarily determined, for example, by assuming a deceleration pattern of the subject vehicle, such as in a case in which the subject vehicle moderately decelerates.

For example, when the subject vehicle travels at a deceleration of 0.15 G after changing lanes and stops at the reference point, the travel distance d is represented by Equation (4) using the above Equation (3).

[Expression 4]

$$d = \frac{v^2}{2 \times 3.6^2 \times (0.15 \times 9.8)} \quad (4)$$

Here, v represents the vehicle speed when changing lanes.

Given that the vehicle speed when changing lanes is the legal speed (60 km/h), it is substituted into Equation (4) to obtain the travel distance (d)=94.48 (m).

In step S20, the completion point setting unit 6 compares the travel distance with the corrected detection range. When the travel distance is longer than the length of the corrected detection range, the completion point setting unit 6 sets the lane change completion point at a position separate from the reference point by the travel distance in the direction opposite to the travel direction of the subject vehicle in step S21. On the other hand, when the travel distance is not longer than the length of the corrected detection range, the completion point setting unit 6 sets the lane change completion point at a position separate from the reference point by the length of the corrected detection range in the direction opposite to the travel direction of the subject vehicle in step S22.

Figure 10:
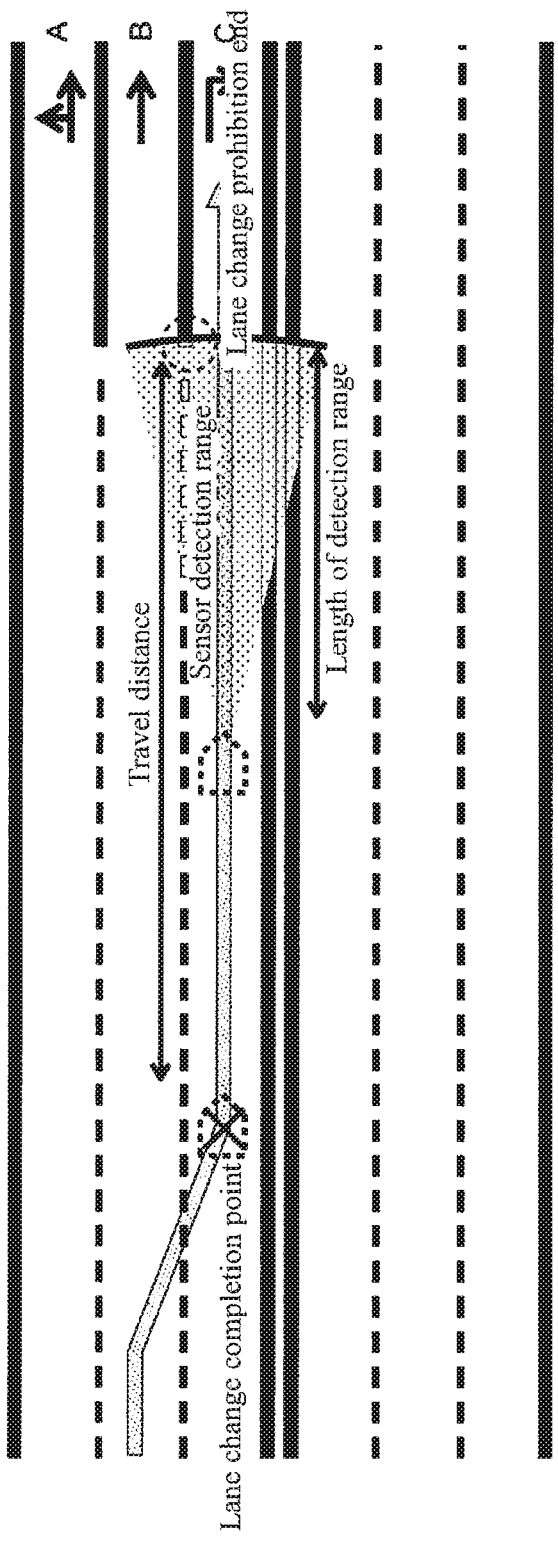
FIG. 10 is a view illustrating an example of the layout of a road.
Figure 11:
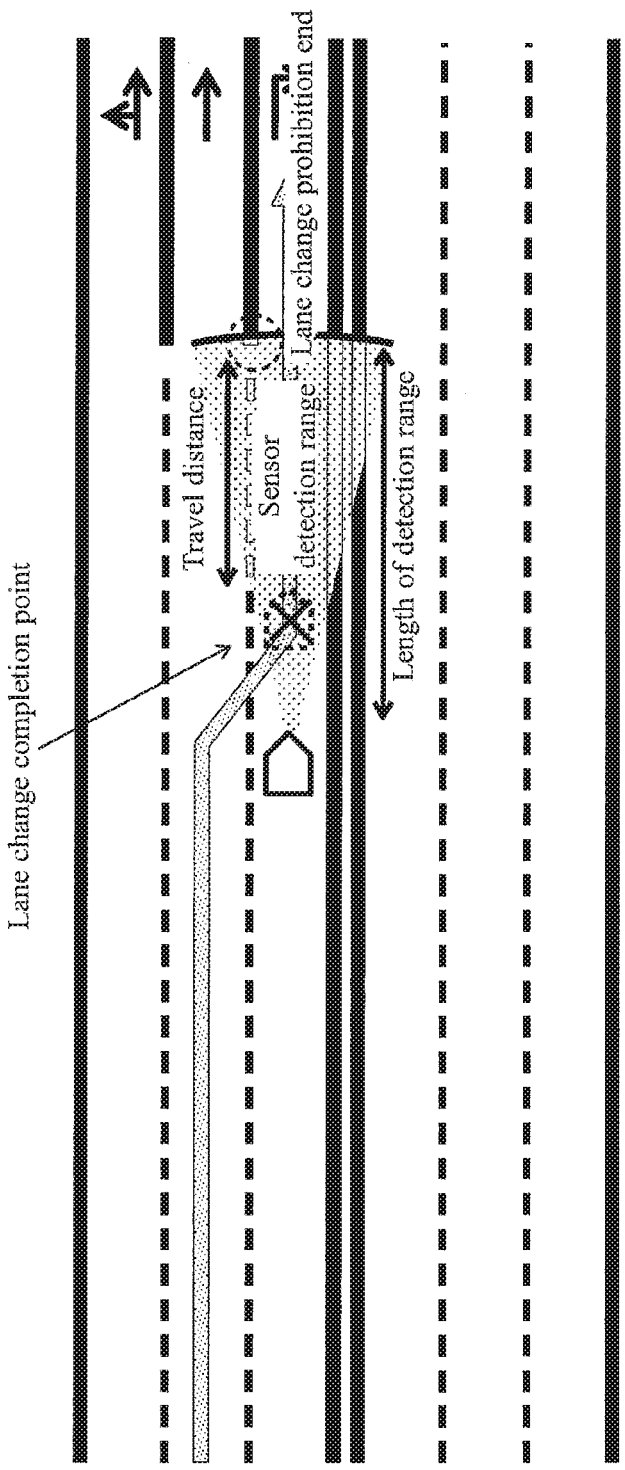
FIG. 11 is a view illustrating an example of the layout of a road.

Here, the relationship between the travel distance and the corrected detection range will be described with reference to FIG. 10 and FIG. 11. FIG. 10 and FIG. 11 are views each for describing a lane change on a three-lane road and each illustrate the layout of the road. The three-lane road is connected to an intersection located ahead. Assume that the subject vehicle has changed lanes from the lane B to the lane C. The description below is on the assumption that the sensor 12 is a camera that has a small error and high certainty factor (typical value of the detection range is 50 meters), for descriptive purposes. Assume also that the reference point is the lane change prohibition end of the line 102.

As illustrated in FIG. 10, if the travel distance is longer than the length of the detection range and the lane change completion point used for assisting the drive is set on the basis of the detection range of the sensor, the lane change completion point will be located ahead of the position represented by the travel distance (in the travel direction). The distance from the position of the subject vehicle to the reference point will therefore be short after changing lanes and the subject vehicle may have to be rapidly decelerated. Thus, when the travel distance is longer than the length of the detection range, the completion point setting unit 6 sets the lane change completion point on the basis of the travel distance.

As illustrated in FIG. 11, if the travel distance is shorter than the length of the detection range and lane change completion point used for assisting the drive is set on the basis of the travel distance, the lane change completion point will be located ahead of the length of the detection range. The reference point will therefore be too near with respect to the length of the detection range when changing lanes and the road environment around the reference point (lane change prohibition end) cannot be perceived by taking full advantage of the detection range of the sensor. Thus, when the travel distance is shorter than the length of the detection range, the completion point setting unit 6 sets the lane change completion point on the basis of the detection range.

In step S23, the vehicle speed estimation unit 7 estimates the target vehicle speed at the lane change completion point on the basis of the vehicle speed at the reference point (lane change prohibition end) and the deceleration pattern. When the lane change completion point is set on the basis of the travel distance, the vehicle speed estimation unit 7 uses the vehicle speed, which is estimated in the control flow of step S18, as the target vehicle speed. When the lane change completion point is set on the basis of the length of the detection range, the vehicle speed estimation unit 7 estimates the vehicle speed in the same manner as in the control flow of step S9 according to the first embodiment.

In step S24, the drive assist control unit 10 performs the drive assist control so that the subject vehicle completes changing lanes at the lane change completion point and the vehicle speed when the lane change is completed comes to the target vehicle speed.

Thus, in the present embodiment, when a location at which a lane change should be performed is present in the travel lane or on the travel route to a destination, the lane change completion point is set with consideration for the error or certainty factor of the detection range of the sensor 12. When the drive assist is performed such that the lane change is completed at the lane change completion point, therefore, rapid lane changes, rapid deceleration after completion of the lane change and the like can be prevented. Moreover, the lane change completion point is set on the basis of a comparison result when comparing the detection range of the sensor 12 with the travel distance for the subject vehicle to travel to the reference point after changing lanes. This allows the behavior of the vehicle during lane changes to be smooth.

As the above, in the present embodiment, the detection range is corrected on the basis of the performance of the sensor. Then, the lane change completion point is set on the basis of the corrected detection range of the sensor 12. Through this operation, the lane change completion point can be determined with consideration for the uncertainty of the sensor 12.

In the present embodiment, the travel distance for the subject vehicle to travel to the reference point after changing lanes is calculated on the basis of the vehicle speed of the subject vehicle after changing lanes and the deceleration from the lane change point to the reference point. When the travel distance is longer than the length of the detection range, the lane change completion point is set at a position separate from the reference point at least by the travel distance in the direction opposite to the travel direction. This allows the behavior of the vehicle during lane changes to be smooth. Moreover, the distance between the lane change point and the reference point is longer than the length of the detection range of the sensor 12 and, therefore, the lane change can be readily performed while compensating for the insufficient length of the detection range.

The above detection range setting unit 5 corresponds to the "correction unit" of the present invention.

Third Embodiment

Figure 12:
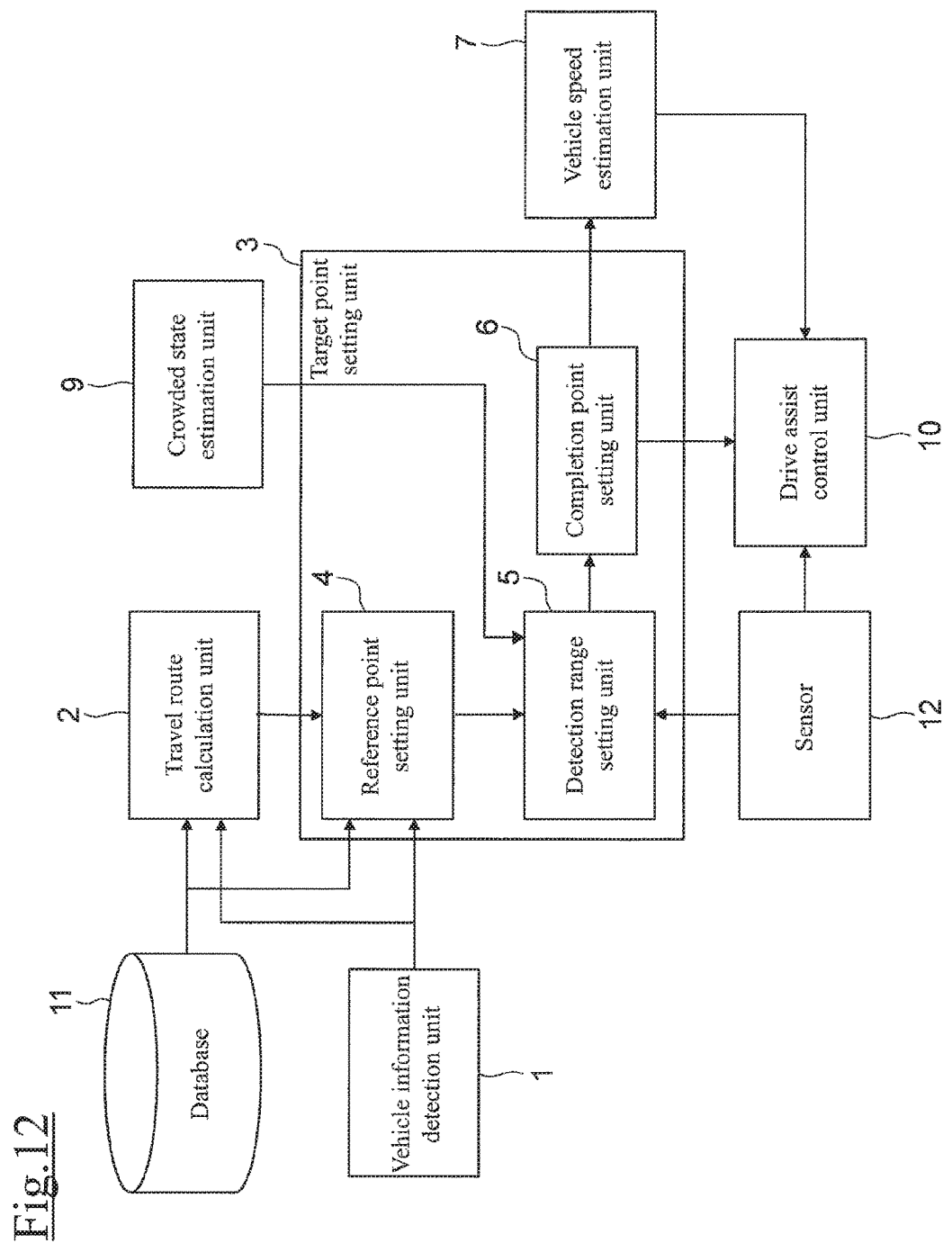
FIG. 12 is a block diagram of a travel assist device according to still another embodiment of the present invention.

FIG. 12 is a block diagram of a drive assist device according to still another embodiment of the present invention. As compared with the above-described first embodiment, this embodiment is different in that the drive assist device comprises a crowded state estimation unit 9. Other features are the same as those in the above-described first embodiment and the description of the first and second embodiments may appropriately be borrowed herein.

The drive assist device includes a crowded state estimation unit 9 in addition to the vehicle information detection unit 1 and the like. The crowded state estimation unit 9 estimates a crowded state of the travel route, on which the subject vehicle travels, before the subject vehicle travels at the lane change location. The crowded state estimation unit 9 estimates the crowded state using communication, such as by acquiring the traffic jam information from external of the vehicle via wireless communication or the like or by detecting situations of other vehicles traveling around the vehicle, using the sensor 12. The range to be estimated by the crowded state estimation unit 9 includes at least a route from the lane change location to the reference point. The crowded state estimation unit 9 outputs the estimation result to the detection range setting unit 5.

Figure 13:
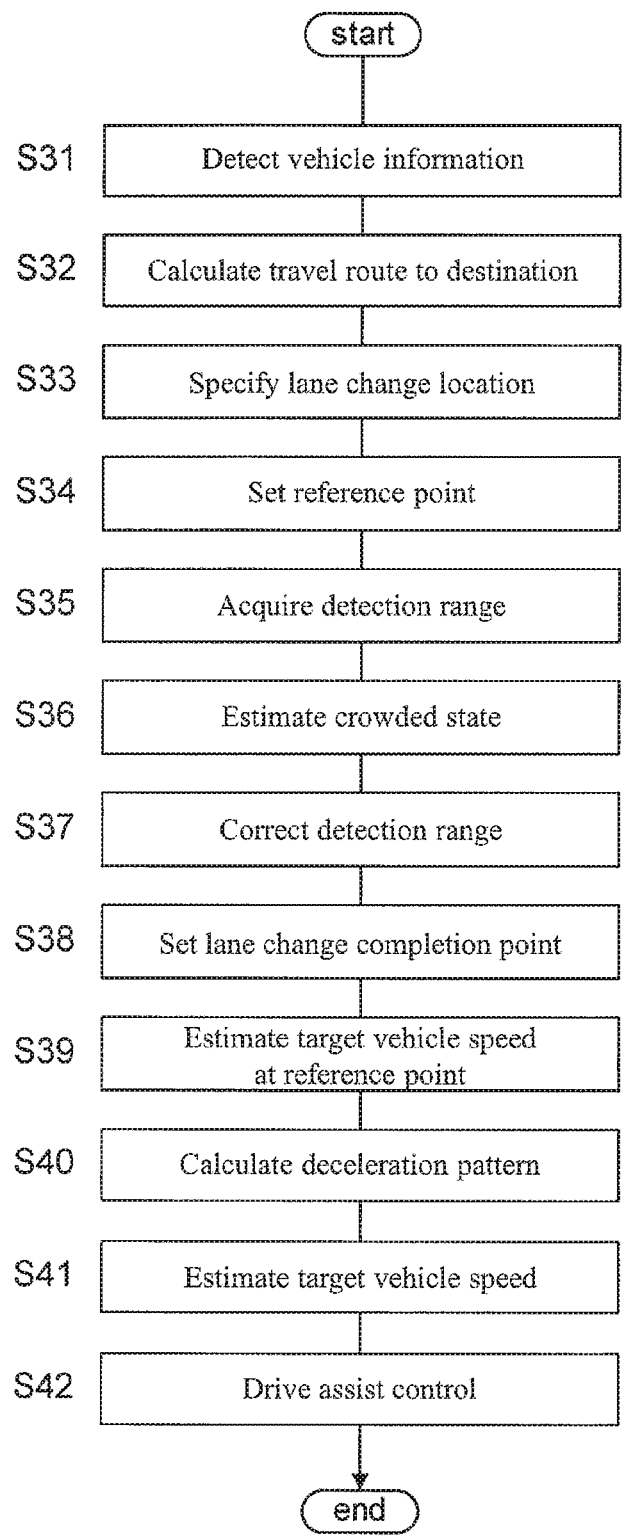
FIG. 13 is a flowchart illustrating a control flow of a drive assist device.

Control of the drive assist device will then be described. FIG. 13 is a flowchart illustrating a control flow of the drive assist device.

The control flow of steps S31 to S35 is the same as the control flow of steps S1 to S5 of the first embodiment.

In step S36, the crowded state estimation unit 9 estimates the crowded state. When acquiring the crowded state via communication, the crowded state estimation unit 9 acquires the traffic jam information of the road on which the subject vehicle is to travel, for example, by using the VICS (Vehicle Information and Communication System, registered trademark).

In addition or alternatively, the crowded state estimation unit 9 can estimate the crowded state using the sensor 12 as below. For example, when the area around the subject vehicle is crowded and the detection range of the sensor 12 is blocked by another vehicle traveling ahead of the subject vehicle (see FIG. 14 to be described later), the length of the detection range of the sensor corresponds to the inter-vehicle distance from the subject vehicle to the other vehicle located ahead. The crowded state estimation unit 9, therefore, calculates the inter-vehicle distance using the vehicle speed of the subject vehicle while detecting the other vehicle by the sensor 12. Then, the crowded state estimation unit 9 compares the inter-vehicle distance with the length (typical value) of the detection range and the crowded state estimation unit 9 determines a crowded state when the inter-vehicle distance is shorter than the length of the detection range. When the detection range of the sensor 12 is temporarily narrowed, it is possible that only the vehicle traveling ahead travels at a low speed rather than that the road is crowded. In such a case, the crowded state estimation unit 9 does not determine that the road is crowded. This allows the crowded state estimation unit 9 to estimate the crowded state from the vehicle speed of the subject vehicle and the detection result of the sensor 12.

Figure 14:
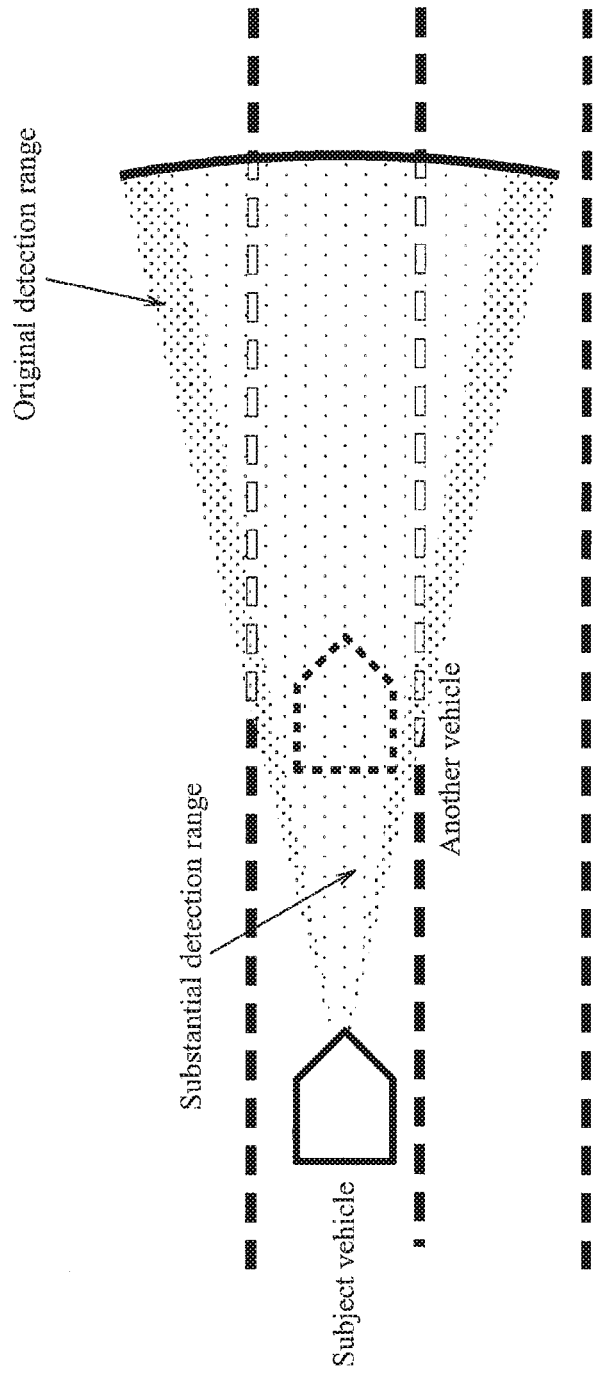
FIG. 14 is a schematic view for describing the detection range of a sensor.

In step S37, the detection range setting unit 5 corrects the detection range in accordance with the crowded state. Here, the relationship between the detection range of the sensor 12 and the crowded state will be described with reference to FIG. 14. FIG. 14 illustrates a state in which the travel route of the subject vehicle is crowded, that is, a state in which another vehicle is traveling ahead of the subject vehicle.

As illustrated in FIG. 14, the travel route is crowded and another vehicle is traveling just ahead of the subject vehicle. In such a case, almost all the lane in which the subject vehicle is traveling is blinded by the vehicle traveling ahead, and the substantial detection range of the sensor 12 becomes narrower than the original detection range, so that the detection range is only the rearward of the other vehicle. Since it is thus difficult to detect the situations ahead of the subject vehicle using the sensor 12, the detection accuracy of the sensor 12 deteriorates.

Figure 15:
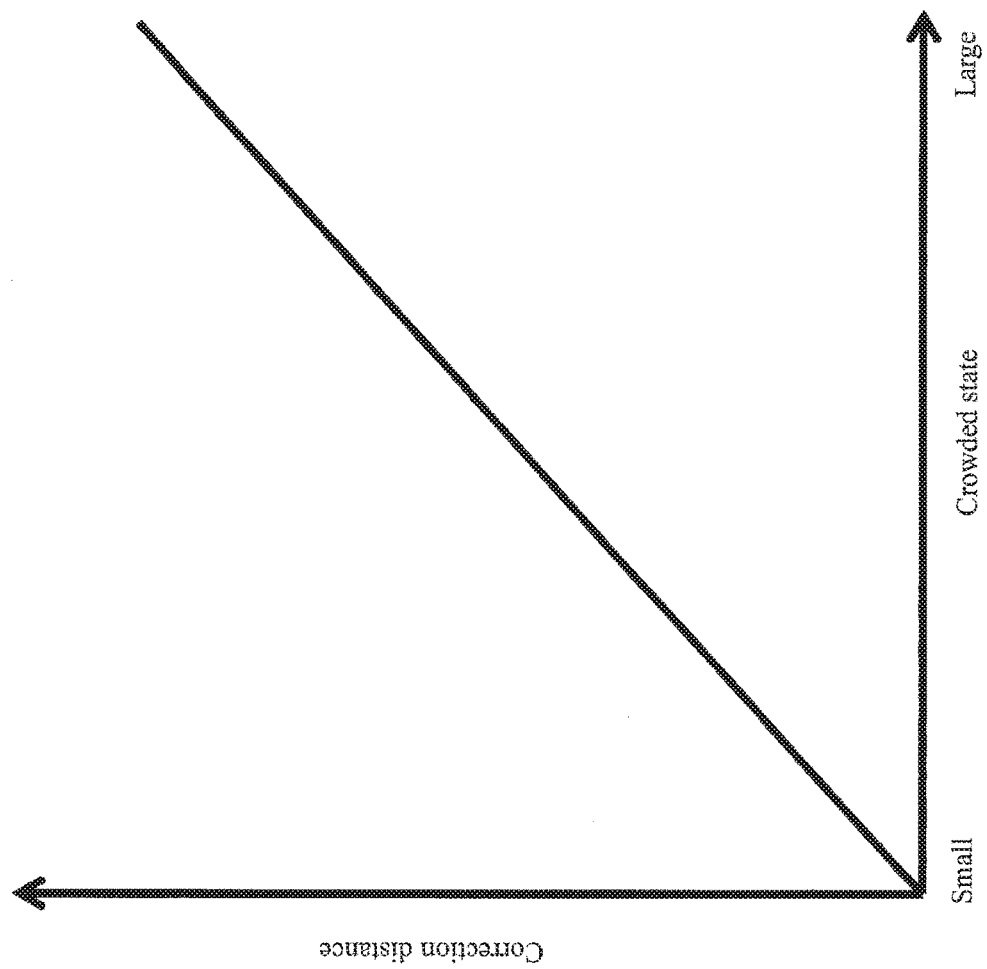
FIG. 15 is a graph illustrating the relationship between a crowded state and a correction distance.

The detection range setting unit 5 stores a map that represents the correspondence relationship between the crowded state and the correction distance. FIG. 15 is a graph illustrating the correspondence relationship represented by the map. The map exhibits characteristics in which, as the crowded state increases, the correction distance increases and, as the certainty factor decreases, the correction distance increases. The correction distance corresponds to a correction value for correcting the detection range by adding to the length of the detection range. As the vehicle lane is more crowded, the crowded state is indicated to be "large."

As the travel route is crowded, the substantial detection range of the sensor 12 tends to be short, so that the detection accuracy for a target object using the sensor 12 will deteriorate when controlling the drive assistance. To compensate for such deterioration in the detection accuracy of the detection range setting unit 5, the correction distance is added to the detection range to correct the detection range to be widened. Specifically, the detection range setting unit 5 calculates the correction distance corresponding to the estimated crowded state while referring to the map. Then, the detection range setting unit 5 corrects the correction range by adding the correction distance to the detection range to correct the correction range.

In step S38, the completion point setting unit 6 sets the lane change completion point at a position separate from the reference point end by the length of the corrected detection range in the direction opposite to the travel direction of the subject vehicle. The control flow of steps S39 to S42 is the same as the control flow of steps S1 to S5 of the first embodiment.

Thus, in the present embodiment, the lane change completion point is set with consideration for the crowded state of the travel route. When the drive assist is performed so as to complete changing lanes at the lane change completion point, therefore, an appropriate lane change can be realized while preventing rapid lane changes due to deterioration in the detection accuracy or rapid deceleration after completion of the lane change.

As the above, in the present embodiment, the crowded state of the travel route on which the subject vehicle travels is estimated, and the detection range of the sensor 12 is corrected on the basis of the crowded state. Through this operation, the lane change completion point can be determined so as to compensate for the deterioration in detection accuracy for a target object when using the sensor 12.

In the present embodiment, the crowded state is estimated on the basis of the situations around the subject vehicle detected by the sensor 12. Through this operation, an actual crowded state can be estimated.

In the present embodiment, the traffic jam information is acquired via communication and the crowded state is estimated on the basis of the traffic jam information. This allows the crowded state to be estimated without using the sensor 12.

The above crowded state estimation unit 9 corresponds to the "estimation unit" of the present invention.

DESCRIPTION OF REFERENCE NUMERALS

1 Vehicle information detection unit
2 Travel route calculation unit
3 Target point setting unit
4 Reference point setting unit
5 Detection range setting unit
6 Completion point setting unit
7 Vehicle speed estimation unit
8 Travel distance calculation unit
9 Crowded state estimation unit
10 Drive assist control unit
11 Database
12 Sensor

The invention claimed is:

1. A drive assist device for assisting a drive when a subject vehicle changes lanes, comprising:
 a position measurement device configured to measure a position of the subject vehicle;
 a sensor provided at the subject vehicle and configured to detect a surrounding situation of the subject vehicle;
 a database configured to store map information; and
 a controller configured to:
  set a lane change location and a reference point on a travel route of the subject vehicle on a basis of the position of the subject vehicle and the map information, the lane change location being a location at which the subject vehicle should change lanes, the reference point being located ahead of the lane change location in a travel direction of the subject vehicle,
  set, on a basis of a detection range of the sensor and a position of the reference point, a point at which the subject vehicle should complete changing lanes, as a lane change completion point, and
  set the lane change completion point at a position separate from the reference point at least by a length of the detection range in a direction opposite to the travel direction.

2. The drive assist device according to claim 1, wherein the controller sets, as the reference point, a position that should be detected by the sensor for travel after changing lanes at the lane change completion point.

3. The drive assist device according to claim 1, wherein the controller is further configured to:
   estimate a vehicle speed at which the subject vehicle should travel at the lane change completion point, on a basis of a distance from the lane change completion point to the reference point and a deceleration from the lane change completion point to the reference point.

4. The drive assist device according to claim 1, wherein the controller further:
   specifies any one of an intersection, a merging point and a branching point that are represented by the map information, as a specified point; and
   sets a location that requires lane change for traveling at the specified point, as the lane change location.

5. The drive assist device according to claim 1, wherein the controller sets the reference point on a basis of a structure of a road represented by the map information.

6. The drive assist device according to claim 1, wherein the controller sets, as the reference point, a start end of a lane change prohibited zone represented by the map information or a start end when changing lanes after changing lanes at the lane change completion point.

7. The drive assist device according to claim 1, wherein the detection range is set on a basis of a typical value of the sensor.

8. The drive assist device according to claim 1, wherein the controller is further
   configured to correct the detection range, and
   set the lane change completion point on a basis of the detection range after correction.

9. The drive assist device according to claim 8, wherein the controller corrects the detection range on a basis of performance of the sensor.

10. The drive assist device according to claim 8, wherein the controller is further
    configured to estimate a crowded state of the travel route on which the subject vehicle travels, and
    correct the detection range on a basis of the crowded state.

11. The drive assist device according to claim 10, wherein the controller estimates the crowded state on a basis of the surrounding situation of the subject vehicle detected by the sensor.

12. The drive assist device according to claim 10, wherein the controller acquires traffic jam information via communication and estimates the crowded state on a basis of the traffic jam information.

13. The drive assist device according to claim 1, wherein the controller is further configured to:
    specify a first lane change completion point at a position separate from the reference point by a length of the detection range in a direction opposite to the travel direction;
    calculate a travel distance for the subject vehicle to travel to the reference point after the subject vehicle changes lanes on a basis of a vehicle speed after the subject vehicle changes lanes and a deceleration from a point of the lane change to the reference point;
    specify a second lane change completion point at a position separate from the reference point at least by the travel distance in the direction opposite to the travel direction; and
    set the second lane change completion point as the lane change completion point when the travel distance is longer than a length of the detection range.

* * * * *